US007099836B2

(12) United States Patent
Cichanowicz

(10) Patent No.: US 7,099,836 B2
(45) Date of Patent: Aug. 29, 2006

(54) AUTOMATED METHOD FOR CONDUCTING BUY/SELL TRANSACTIONS FOR NON-COMMODITY MATERIALS OR DEVICES

(76) Inventor: J. Edward Cichanowicz, P.O. Box 905, Saratoga, CA (US) 95071

( * ) Notice: Subject to any disclaimer, the term of this patent is extended or adjusted under 35 U.S.C. 154(b) by 927 days.

(21) Appl. No.: 09/839,245

(22) Filed: Apr. 23, 2001

(65) Prior Publication Data

US 2002/0023044 A1 Feb. 21, 2002

Related U.S. Application Data

(60) Provisional application No. 60/199,126, filed on Apr. 24, 2000.

(51) Int. Cl.
*G06F 17/60* (2006.01)
(52) U.S. Cl. ............................................. 705/26; 705/7
(58) Field of Classification Search ................... 705/29, 705/26, 7, 27; 110/342, 341
See application file for complete search history.

(56) References Cited

U.S. PATENT DOCUMENTS 5,033,004 A * 7/1991 Vandivier, III .............. 700/103
5,224,034 A * 6/1993 Katz et al. ..................... 705/7

FOREIGN PATENT DOCUMENTS

JP 08287140 A * 11/1996

OTHER PUBLICATIONS

Effects of Coal Quality on Power Plant Performance and Costs; vol. 4; Review of Coal Science Fundamentals; Electric Power Research Institute; Feb. 1986; 2 pages.*

* cited by examiner

*Primary Examiner*—Elaine Gort
(74) *Attorney, Agent, or Firm*—Arent Fox PLLC

(57) ABSTRACT

A method for conducting engineering process analysis is a unified part of evaluating buy/sell transactions for non-commodity materials or items and is particularly suited to the matching of buyers and sellers for non-commodity materials or items, defined as materials or items that cannot solely be distinguished by price alone, in that subtle differences in features or chemical/physical characteristics will influence the performance of a particular process or design that utilizes the material or item. In the system, databases describing the materials or items available in a marketplace are linked with an automated methodology to evaluate the performance of a process or design with any one or combination of the materials or items. Accordingly, an "intelligent exchange", is provided in which key decision support tools enable the procurement of the material or item optimal with respect to the performance of the process. Examples are the evaluation of sources and suppliers of (a) coal, for use in steam electric equipment for electrical power production, (b) crude oil, for use in refining of gasoline and other petroleum derived fuels, (c) electronic components, for use in engineering circuitry design, and (d) paper pulp, for use in paper manufacture.

16 Claims, 1 Drawing Sheet

FIGURE
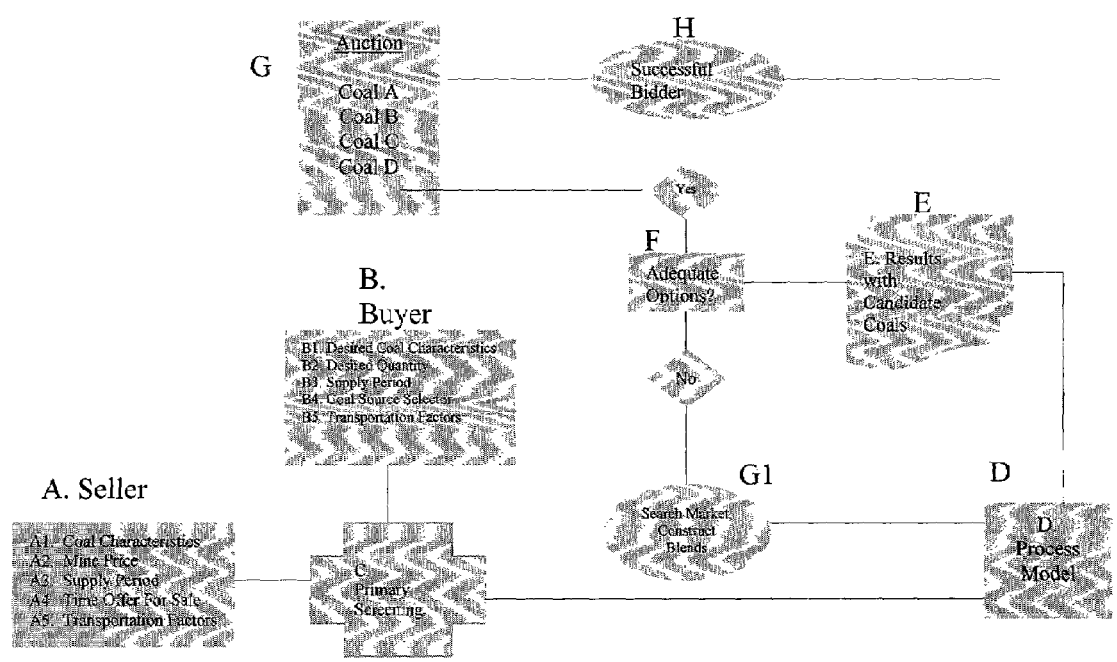

AUTOMATED METHOD FOR CONDUCTING BUY/SELL TRANSACTIONS FOR NON-COMMODITY MATERIALS OR DEVICES

This nonprovisional application claims the benefit of U.S. Provisional Application No. 60/199,126, filed Apr. 24, 2000, the subject matter of which is incorporated herein by reference in its entirety.

TECHNICAL FIELD

This invention relates to a method and system for conducting engineering process analysis as a unified part of evaluating buy/sell transactions for non-commodity materials or items. This method and system is particularly suited to the matching of buyers and sellers for non-commodity materials or items, defined as materials or items that cannot solely be distinguished by price alone, in that subtle differences in features or chemical/physical characteristics will influence the performance of a particular process or design that utilizes the material or item. An important aspect of the inventive system is the linking of databases describing the materials or items available in a marketplace with an automated methodology to evaluate the performance of a process or design with any one or combination of the materials or items. Accordingly, the inventive system comprises an "intelligent exchange", in which key decision support tools are provided to enable the procurement of the material or item optimal with respect to the performance of the process. Specific examples of these are the evaluation of sources and suppliers of (a) coal, for use in steam electric equipment for electrical power production, (b) crude oil, for use in refining of gasoline and other petroleum derived fuels, (c) electronic components, for use in engineering circuitry design, and (d) paper pulp, for use in paper manufacture.

BACKGROUND OF THE INVENTION

Currently, the exchange between buyers and sellers of non-commodity items or products depends on a web of personal contacts, newsletters, and trade associations that despite best efforts of procurement and marketing organizations provide inconsistent and less than optimal results. For the specific case of managers of electrical generating facilities buying coal for steam and power production, this uncoordinated method works to the disadvantage of both buyers and sellers. There are hundreds of coal suppliers nationwide, and the characteristics of the product coals are rarely, if ever, the same. Also, coal is not a true commodity—subtle differences in the chemical composition of both organic and particularly inorganic components can have a dominant effect on the performance and operation of steam generation equipment, which influence power plant reliability and the wholesale power production cost. Further, the coal consumption requirements of large power stations usually cannot be satisfied by one source—several sources must be accessed, and each will provide coal of different composition. These differences in composition must be accounted for in assessing the desirability of any given coal product and negotiating a price.

The usual methodology for buyers and sellers interacting is initiated by the seller. In most commercial environments, the Seller assumes the obligation of finding customers and securing a purchase agreement, thus the actions and methodology are defined to suit the seller's needs.

Certain markets, however, are buyer-driven. Specifically, buyer-driven markets prevail in cases where large quantities of the material or item to be purchased are required for batch unit operations, and/or it is inconvenient for the buyer to store the required material or items. Examples of cases described by this scenario are procurement of coal, feedstock for paper production, and the refining petroleum products. The procurement of coal for power generation is the foremost example—the utility issues a request for proposal (RFP) for the purchase of a fixed quantity of coal, and within the RFP defines the acceptable range of chemical composition and physical characteristics. Bidders interested in responding to this RFP to supply the subject coal describe the characteristics of their proposed product and the price (either for "pickup" by the utility's transport provider at the mine, or delivered to the site) via sealed bid. The utility "shortlists" the suppliers to a total number that is usually between 3–6, based on price and cost factors the utility has developed that accounts for differences in coal composition. Several individual suppliers may pool their resources to assemble one bid, to provide either the requisite quantity of coal desired, or meet special composition requirements that can only be achieved by blending various coals. The "shortlist" of suppliers then engage into a competitive bidding process, with the utility selecting the least cost product.

The conventional transaction process, although providing the buyer with a competitive bidding mechanism, may not completely maximize market efficiency. Further, the conventional transaction process does not insure that the buyer has every opportunity to purchase the coals that are optimal for any given generating station. Specifically, some suppliers whose coal may be suitable for a power station only when as a constituent of a blend may not be visible to either the buyer, or to other sellers that may utilize the product in a blend. Further, the fact that coal cannot be treated as a true commodity complicates consideration of a broad array of candidate suppliers. As each coal source is unique, a significant amount of analysis is necessary to determine the appropriateness of each candidate coal for a given power station. Further, the "scheduled" nature of the market—the timed issuance of RFP documents for purchase contracts—may not support the most efficient allocation of resources. Specifically, several procurements scheduled for approximately the same time period will in essence "compete" with each other, driving up the price for buyers.

SUMMARY OF THE INVENTION

Recognizing the aforementioned limitations, it is an object of the present invention to provide for an interactive on-line system for evaluating the performance of engineered systems or equipment that utilize non-commodity materials or items, using a network of databases (that may be either inherent to the present system or provided by a third party) that describe the features and characteristics of these materials and items, ultimately supporting the procurement of the most optimal materials or items. In essence, the inventive system comprises an "intelligent exchange", in which key decision-support tools are provided that enable the selection of the optimal material or item for the design or process (in the example case, coal). Many examples of these non-commodity materials or items exist, in addition to the four cases cited previously.

It is another object of this invention to provide for a computerized network for exchange of key technical and market information between buyers and sellers of coal, that is seamlessly integrated into the functionality of critical decision-support tools.

It is another object of this invention to provide a database of available coals, as described and defined by key chemical and physical characteristics provided on-line by sellers, that can directly communicate with a process or performance model and provide input for analysis by buyers.

It is yet another object of this invention to utilizing an engineering process simulation model to conduct an on-line "search" of the databases of available coal, and simulate the performance in steam-generation equipment for electrical power production using the candidate coals The database may either be included in the inventive system, or reside as third-party databases as part of a conventional exchange for coals and other items. The results of this process simulation will rank each specific coal in terms of electricity production cost, and a reliability and/or operability factor that reflects the "quality" of coal in terms of minimizing operating problems, potential for downtime, or a "derate" penalty.

It is yet another object of this invention to allow a buyer of coal, who has issued a request-for-proposal for a unique coal specification that can only be achieved by a custom blend of individual coals, to search the database of available coals with the intent to identify a "recipe" using the candidate coals to prepare this custom blend.

It is yet another object of this invention to provide a transport model, linked to the buyers ands sellers coal database, that utilizes an automated procedure to identify the least cost transport routing for coal, thus providing a "delivered" coal cost in addition to the mine price. It is yet another object of this invention to provide an auction mechanism of candidate coals for procurement by a buyer, considering only those coals that are identified by the engineering process model as best suited for the buyer.

It is a further object of this invention to provide for a real time process evaluation function, which evaluates the efficacy of the purchase of any coal in terms of actual performance of steam generation equipment once the coal is delivered to the site and utilized for power production.

In accordance with the present invention, a system for establishing an intelligent marketplace for the evaluation of coals, the identification of special formulations, mixtures, or "blends" to achieve a desired specification of the non-commodity item or material, a transport model, a process evaluation function, and bid and auction are proposed. For the specific example of evaluating and purchasing coal for steam generation equipment for power production, the marketplace can contain a database of all coals available for purchase by any buyer in the market. Each customer can employ an on-line performance model of the power production steam boiler. Each individual generator (or more generally, process unit) would be represented by a unique process model that simulates the performance of the subject unit with a given coal (or more generally, feedstock non-commodity item or other material). This process or design model will search the database and evaluate the power production cost, and the corresponding reliability or "risk" factor, for specific units in the utility for coals that meet the general features of the desired specification. Finally, an intelligent database capable of data mining techniques would relate operating trends of the subject unit to the characteristics of the material or item, and demonstrate which coals (or generally feedstocks) are best suited. This latter information would be used in preparing specifications for future procurement.

BRIEF DESCRIPTION OF DRAWINGS

All objects and advantages of the proposed system will be evident from the following description, which should be considered in conjunction with FIG. 1, which represents a block diagram of the logic flow for an exemplary embodiment of the invention.

DETAILED DESCRIPTION OF A PREFERRED INVENTION

The inventive system utilizes a combination of individual processes, which are electronically hosted and managed over a network such as any commercial or noncommercial form of the Internet. The inventive system will successfully operate over any embodiment of the Internet, as well as within corporate or organizational intranets, regardless of the number, arrangement, location, and interconnectivity of the servers, local area networks, data storage devices, or any features of this widely used medium. Thus, any effective arrangement of terminals, servers, databases, methods of initiating an "on-line" transaction, or other specific methods of interacting with the commercial Internet can be utilized.

For the specific example of evaluating and purchasing coal for steam generation, the inventive system can access data in either of two ways. First, the inventive system can utilize buyer/seller databases that are inherent to its organization and structure. Alternatively, the inventive system can use third-party databases of coals, and conduct the unique and insightful evaluation and decision-support analysis using these as external input sources.

The following inventive system allows for conducting transactions of non-commodity materials or goods, whose suitability for satisfying the needs or requirements of a buyer can be determined by an on-line evaluation of an engineering design or process model. Note that the specifics of this descriptive example—the evaluation and procurement of coal for power generation—are for illustrative purposes only. Any of the aforementioned exemplary fields or applications can be utilized in embodiments of the inventive system. The specific example is not meant to limit the ultimate applicability of the inventive system, but to concisely illustrate how the system can be utilized.

The subsequent description addresses the functionality of the inventive system. Again, any effective arrangement of how the user interacts with the inventive system can be utilized—the benefits of the inventive system are indifferent to the arrangement of information on a web page, or whether pop-up menus, pull-down menus, or buttons are used to execute the instructions. Rather, the innovative features of the inventive system include the use of engineering design or process models, augmented with a transport model (where transport issues are significant cost factors), to optimize the selection and procurement of a non-commodity item for use in a particular process plant, or design.

Sellers or Suppliers Sector

The sector of the marketplace dedicated to sellers and suppliers allows such individual entities to specify the characteristics of the coal offered, the quantity for sale, timing of the deliveries, and the price at the mine. The seller/supplier, by registering with the marketplace, will also identify their specific co-ordinates of location. These location co-ordinates will be subsequently used by a transportation model that defines the least cost routing method of coal from the seller's mine to the buyer's power station. An example of the specification information to be provided by the seller for entry into the marketplace database is displayed in the subsequent example.

Item 1: Seller Defines Coal Composition Characteristics

The Seller accesses the marketplace, shown at in FIG. 1 at Point A, through any of several prior art methodologies. Once "logged onto" the marketplace, the Seller can provide, for example, the following information regarding coal offered for sale designated as Items A1–A5.

Item A1. Summary of Coal Characteristics

| 1. Fuel Type: | U.S. Low Sulfur | | U.S. Medium Sulfur | | U.S. High Sulfur | | Powder River Basin | |
|---|---|---|---|---|---|---|---|---|
| 2. Source: | Sewickley Seam | | Kittanning Seam | | Illinois #6 | | Wyodak Seam | |
| 3. Analysis | Wet | Dry | Wet | Dry | Wet | Dry | Wet | Dry |
| Ash | 9.6% | 10.4% | 6.5% | 7.3% | 9.7% | 11.1% | 5.3% | 7.4% |
| Volatile Matter | 33.1% | 35.7% | 35.9% | 40.5% | 35.6% | 40.8% | 30.6% | 42.5% |
| Fixed Carbon | 49.8% | 53.8% | 46.2% | 52.1% | 41.9% | 48.1% | 36.0% | 50.1% |
| Moisture | 7.40% | 8.0% | 11.40% | 12.9% | 12.80% | 14.7% | 28.10% | 39.1% |
| Heating Value | 12,528 | 13,529 | 12,414 | 14,011 | 11,011 | 12098 | 8,655 | 9566 |
| Sulfur | 0.94% | 1.0% | 1.65% | 1.9% | 2.75% | 3.2% | 0.36% | 0.5% |
| C | 69.3% | 74.8% | 69.7% | 78.7% | 61.5% | 70.5% | 50.3% | 70.0% |
| H | 4.6% | 5.0% | 4.6% | 5.2% | 4.2% | 4.8% | 3.5% | 4.9% |
| N | 1.6 | 1.7% | 1.4% | 1.6% | 1.2% | 1.4% | 0.9% | 1.2% |
| 4. Ash Chemistry | % of Ash | % of Ash | % of Ash | % of Ash | % of Ash | % of Ash | % of Ash | % of Ash |
| Si | 56.70% | 6.27% | 44.15% | 4.72% | 47.81% | 5.38% | 34.56% | 3.65% |
| Al | 25.00% | 2.77% | 28.24% | 3.02% | 21.52% | 2.42% | 17.16% | 1.81% |
| Fe | 10.00% | 1.11% | 20.65% | 2.21% | 17.79% | 2.00% | 5.98% | 0.63% |
| Ca | 1.80% | 0.20% | 1.94% | 0.21% | 5.60% | 0.63% | 20.09% | 2.12% |
| Mg | 0.78% | 0.09% | 0.42% | 0.04% | 1.41% | 0.16% | 0.11% | 0.01% |
| Na | 0.62% | 0.07% | 0.18% | 0.02% | 0.91% | 0.10% | 1.39% | 0.15% |
| K | 2.19% | 0.24% | 1.31% | 0.14% | 2.08% | 0.23% | 0.50% | 0.05% |
| Ti | 0.70% | 0.08% | 0.98% | 0.10% | 1.07% | 0.12% | 1.22% | 0.13% |
| P | 0.44% | 0.05% | 0.55% | 0.06% | 0.17% | 0.02% | 0.90% | 0.10% |
| $SO_3$ | 1.28% | 0.14% | 0.85% | 0.09% | 2.45% | 0.28% | 12.02% | 1.27% |
| Error | 0.41% | 0.05% | 0.71% | 0.08% | −0.81% | −0.09% | 1.30% | 0.14% |

Items A1.1–A1.4 are examples of key coal characteristics that essentially "fingerprint" the coal in terms of factors that determine the cost of electricity production at the power station. Additional details defining composition of trace elements can be provided for species that may influence the performance of environmental control technology, such as flue gas desulfurization or selective catalytic reduction process equipment. These species can include virtually any known element, but practically will mostly include arsenic, chlorides, fluorides, etc. The availability of a process model for evaluation of production cost and "technical risk" uniquely allows coals to be evaluated according to trace constituents such as the aforementioned, and others.

Other information can include the Mine Price (Item A2), Supply Period (Item A3), Time Offer For Sale (Item A4), and Transportation Analysis Factors, which are discussed as follows:

Item A2. The Mine Price reflects the offered price for purchase of the coal at the mine. The conventional industry approach is for the buyer to accept the responsibility for identifying and arranging for the least cost transport from the mine to the plant. Accordingly buyers who utilize this mode of operation will employ the Mine Price for this analysis. As described subsequently, the inventive system contains a tool to optimize and evaluate the least cost transport method to translate the mine price to a delivered price at the plant.

Item A3. The Supply Period—specifically the period in time over which the seller intends to offer the quantity of coal to be shipped from the mine—can be designated by enabling an interactive menu to define a period such as 30 days, 60 days, 6 months, or an alternative period of time. This information can include start and end dates in calendar time.

Sellers can designate how the coal production is to be distributed over the supply period, either uniformly, or otherwise. For example, if the supply period is designated as five months, sellers can avail the quantity of coal equally over the five month period, or perhaps due to availability of mining equipment or labor, offering 40% of the quantity in the first month. The remaining 60% of the quantity available would be equally apportioned over the remaining 4 months (e.g. 40% there first month, and 15% monthly thereafter). This specific case is illustrative only; other cases are equally feasible.

Item A4. Sellers can identify the Time Period For Sale over which the offer for sale is valid: by specifying either the number of days from the present date, or a specific date or dates. Transactions between buyers and sellers should be completed within this time frame for all terms and conditions to be valid.

Item A.5. Sellers are to identify key information that is to be used to allow the buyer either to evaluate their own transportation options and cost, or to utilize the transportation model inherent in the inventive system to identify the optimal mode and least cost. Specifically, sellers will identify their nearest location or otherwise preferred conduit for either rail, truck, or waterway transport. Alternatively, sellers will provide their Standard Point Location Code (SPLC), which when used with the transport model of the inventive system will allow defining transport options and cost.

These factors define a complete set of information from which buyers can conduct a preliminary assessment of the feasibility and cost of employing this specific coal in any given power station. Sellers are anticipated to maintain this information for all candidate fuels, and specifying any relationships between the quantity of coal to be sold, and the offering price.

Buyers Sector

This sector of the marketplace allows individual buyers to define the general specification of coals desired for specific plants or a group of plants. The buyer can also in this section initiate an on-line analysis of the power production cost and risk associated with using each different coal, and further search for special blends of coals to meet a custom need. Buyers can also initiate the analysis by a transportation model to determine the least cost method of routing coal from the mine to the buyers plant. The buyer will identify major transportation means available from a major transportation hub that is available for transfer of the coal to the plant site.

The Buyer can access the marketplace, shown as point B, through any conventional art methodologies. Once "logged onto" the marketplace, the buyer selects from three functions offered—issuing a general procurement specification, conducting an on-line analysis of candidate fuels, and preparing specifications for custom blends.

Item 1: Buyer Defines General Specification

Coal-fired plant managers seek to evaluate a large number of coals that offer a wide range of coal properties, that when used in conjunction with the process model specifies a cost production curve. The innovative elements of this feature allow a power production facilities manager to view how the delivered cost and composition not of any one coal but a range of coals provides the necessary information from which any one coal can be selected.

The format for specifying desired coal properties is identical to that utilized by the seller, and is exemplified by the following:

Item B1a: Coal Composition Characteristics

The Buyer provides information, at Point B as shown, regarding coal desired to be purchased, that is analogous to the information describing the features of coal to be offered in the market. The following example table describes a range of composition that a buyer may desire, and is shown for illustrative purposes only, and not to reflect a given coal composition. Specifically, the buyer must enter the desired range of values for the major characteristics that define coal. Although the inventive system is not limited to any given set of listing of attributes, the commonly used list of attributes described in Section A for the coal supplier is used as an example.

Summary of Desired Coal Characteristics, as Specified by Potential Buyers

| Source: N. Appalachia | | |
|---|---|---|
| Analysis | Minimum Values | Maximum Values |
| Ash | 5 | 13 |
| Volatile matter | 5 | 20 |
| Fixed Carbon | 30 | 50 |

-continued

| Source: N. Appalachia | | |
|---|---|---|
| Analysis | Minimum Values | Maximum Values |
| Moisture | 5 | 30 |
| Heating value | 10,000 | none |
| Sulfur §) | 0.4 | 1.2 |
| Carbon (C, %) | 35 | 45 |
| Hydrogen (H, %) | 4 | 8 |
| Nitrogen (N, %) | N/a | N/a |
| Ash Chemistry | | |
| Si | 20 | 40 |
| Al | 20 | 40 |
| Fe | 4 | 15 |
| Ca | 2 | 10 |
| Mg | N/a | N/a |
| Na | N/a | 5 |
| K | N/a | 4 |
| Ti | 3 | 7 |
| P | N/a | N/a |

This composition information that comprises Item B1 may be provided in any level of detail as desired by the buyer, but is anticipated to be directly parallel to the information defined by the coal seller/supplier.

Item B2. Desired Quantity

Analogous to the information submitted by the coal supplier, the potential buyer can define both the quantity of fuel desired for purchase, and the time period over which deliveries are required, The quantity of fuel desired can be specified by using any input method—including simply entering numeric values, or selecting a range from a pull-down, pop-up, or other type of menu.

Item B3. Supply Period

The desired Supply Period—specifically the period in time over which the quantity is desired to be delivered to the power station—can be designated by enabling an interactive menu to define a period such as 30 days, 60 days, 6 months, or an alternative period of time. This information is to include start and end dates in calendar time. Similar to the situation discussed under the "Sellers Sector", buyers may use the inputs to section B.1. and B.2. to specify that a nonuniform delivery schedule is desired, in which deliveries of coal or the materials scheduled is biased to the beginning or the end of the delivery window. Such a specification may be necessary to accommodate the unique production needs of the facility owner, or the capabilities of the fuel-receiving equipment.

The purpose of the buyer specification is two-fold: to allow screening of candidate coal suppliers, and allow a group of sellers to combine or blend products to meet their needs.

Item B4: Coal Source Selection

This element of the Buyers Sector can allow buyers to specify the general region from which coal is obtained, the sources of coal from which blends can be constructed, and authorize the software blending tool to search for a blend that meets these characteristics. Although the buyer has clearly and in detail described in B.1. the characteristics of the coal to be purchased, specifying the source is additional information that can be used in the screening process to find a subset of most desirable coals. The inventive system is designed and constructed to operate without the additional information provided in this section; the benefit is a reduction in analysis time that may be of advantage in certain circumstances.

As an option, buyers can identify the desired source of coals to be considered in the screening process, or indicate no preference, in any manner, including that described as follows:

Summary Of Candidate Sources, By Region

| Source | Principal Source (Y or N) | Can be Used In Blend? (Y or N) |
|---|---|---|
| North Appalachia | | |
| Central Appalachia | | |
| Central Appalachia | | |
| Pittsburgh Seam 9 | | |
| Illinois High Sulfur | | |
| Powder River Basin | | |

The inventive method is not limited to the coals from the sources presented in the above example table, but applies to any of the essentially hundreds of various specific coal producing regions in the domestic U.S., or from world-wide sources.

Item B.5. Transportation Factors

This element of the inventive system uses the SPLC defined by both the buyer and seller to evaluate the least cost transport routing of coal from the originating mine to the consuming power station. Three major transportation modes exist: via rail, roadway, or barge. Depending on the source and the routing, either one or all three methods can be deployed in transporting coal to the power station. The optimization of such variables is straightforward, and utilizes as input the distance from the mine to the power station via these routes, the number of "transloading" steps required, and the cost for transport and transloading. The transport distances via each route are determined from publicly available digital maps provided by the U.S. government and other sources, according the analysis is straightforward. The transport rates for each of the major transit modes that have been negotiated by the buyer for existing contracts will provide input to this analysis, as well as estimates of costs for transloading from one transport mode to another. Similar to the case for marketplace coal databases, this analytical capability can either be provided unified to the inventive system, or by a third-party. However, the uniqueness is in the integrated application of this tool to comprise an intelligent exchange.

Items C/D: Coal Screening Model

In the case of coal procurement, the "matching" of buyers and sellers requires more than searching for agreement between the attributes of a particular material or item as offered by the seller and those attributes required or desired by the buyer. (These functions can be effectively carried out in "bulletin board" type postings or conventional exchanges, in contrast to the workings of the "intelligent exchange" provided by the inventive system). Rather, the suitability of a particular product or material is determined by a continuum of features, which are best compared by a process engineering performance model. The process performance model can be used for all screening exercises, or optionally two stages of screening can be conducted: (1) preliminary, based on simple analytical techniques, and (2) a secondary screening based on a process engineering model. Points C and D reflect the position in the process flow sheet at which this screening takes place.

For example, the user can either answer simple questions such as "do you wish to conduct a preliminary screening of candidate coals according to defined characteristics", or "do you wish to conduct a secondary screening of candidate coals, according to the engineering process model for the subject power station"? Any format for specifying or instructing the marketplace software to initiate these evaluations can be part of the proposed methodology.

Item C. (Optional) Preliminary Screening. This first, and optional, stage of screening allows buyers to eliminate from the marketplace a number of coals that do not meet the specification. This optional initial screening can be conducted using neural networks, artificial intelligence, and/or fuzzy logic, that considers the number of variables that describe coal composition that are within the range specified by the Buyer, and the extent of deviation, if any. Cost evaluation may or may not be included in this optional Preliminary Screening analysis. Rather, this phase addresses the question of whether the Seller's offered fuel meets at least a minimum number of criteria that are important to the buyer. As an example, an operator may wish to exclude from consideration certain coals that contain above a specified threshold for sodium (Na), a notorious agent that induces fouling of boiler heat transfer surfaces, thereby interfering with efficient power generation.

Alternatively, the need to maximize the useful lifetime of catalyst in selective catalytic reduction process equipment could mandate a minimum content of available calcium oxide (CaO) in fly ash, and a maximum arsenic level. Using this optional preliminary screening methodology, a subset of candidate coals can be identified by comparing the composition as submitted in the Sellers/Suppliers Sector to the desired composition as defined by the Buyer. Thus, coals that meet the specification for each variable or combination of variables qualify for the next round of screening. Coals in which a number of variables are outside the specified range may or may not qualify for the next round of screening, depending on the number of variables outside the specified range and the extent of deviation.

Item D. Process Screening. After the preliminary optional screening (to simplify any subsequent analysis), detailed screening based on a power production process model is conducted. For a specific generating unit, the buyer activates a function on the interface screen enabling a power production cost model to predict the cost of electricity production, and assign a factor calculated from coal properties to assess a quantitative or semi-quantitative indicator of operating risk, which is related to coal "quality". This indicator of coal quality is a generally quantitative or semi-quantitative assessment of potential for inorganic species to foul or slag heat transfer surfaces, corrode fireside surfaces, influence the production of species of environmental concern, and induce either limits to an operating units load, or cause outages. Further, the coal-specific unit power production heat rate (indicative of the thermal efficiency of conversion of coal heat content to electrical power) is calculated for each candidate coal in the subject unit, taking into account process impacts, auxiliary power consumption, and other parasatic indirect factors that vary with each coal. This power production model considers organic and inorganic matter in the fuel, and the physical and engineering characteristics of the boiler and power plant. The cost of fuel at the mine as specified by the Seller is employed, and adjusted by a transport cost as identified by the transportation cost model to provide a delivered price at the Buyers power station. The buyer may enable the process model to search all coals in the database, or as described in the previous section, focus on a geographic region, or certain categories of coal.

Point E represents the decision-making point in the marketplace service for illustrating results of the process model. Examples of the results produced from the engineering process model and accordingly displayed identify the ranking of coals according to power production cost and the quantitative or semi-quantitative indicator of coal quality (for the example case, the slagging/fouling characteristics) and showing for each candidate coal the predicted production cost, operating reliability, or a combination of factors as summarized in the following example:

Results: Power Production Costs and Operating Characteristics course depends on the emissions of the species of interest or concern. Accordingly, the controlled emission rates of sulfur dioxide ($SO_2$), nitrogen oxide (NOx), particulate matter (PM), and trace species such are mercury (Hg, of concern to environmental regulatory agencies as potential "hazardous air pollutants") would be predicted and reported. Further, the preceding table shows only the "slagging" risk factor for illustrative purposes; other risk factors that describe the tendency of the inorganics to foul heat transfer surfaces, induce a "derate" to plant generating capacity, describe the potential to corrode or erode boiler tubes, or other common operating characteristics can be calculated and displayed as part of the analysis.

| Coal Supplier | Cost at Mine ($/ton) | Cost, Delivered to Station ($/ton) | Estimated Heat Rate (Btu/k Wh) | Boiler Thermal Efficiency | Auxiliary Power (kwh) | Peak Rated Capacity (MW) | Power Production Cost ($/MWH) | Slagging Risk Factor (L, M, H) |
|---|---|---|---|---|---|---|---|---|
| X | 0.95 | 1.35 | 10,700 | 88.8 | 1233 | 350 | 0.025 | M |
| Y | 0.93 | 1.32 | 10,730 | 88.7 | 1144 | 345 | 0.024 | M |
| Z | 0.99 | 1.40 | 10,450 | 88.9 | 1056 | 350 | 0.023 | H |
| Q | 0.90 | 1.25 | 10.876 | 87.6 | 1266 | 344 | 0.026 | H |
| A | 1.05 | 1.45 | 10.555 | 89.9 | 1433 | 350 | 0.030 | L |

Station: Smith
Unit: 1
Present Maximum Rated capacity: 350 MW
Annual capacity Factor: 70%

A unique and desirable feature of these results is the ability to present to the coal buyer a cost versus risk tradeoff, thus distilling the coal purchase decision to the same criteria used in any investment that involves a future and uncertain payoff. Specifically, the example results show that the least production cost is associated with the highest technical risk, and the highest production cost associated with the least technical risk. The value of the inventive system is to present to the coal buyer a comparison of the production cost versus risk tradeoff that he or she confronts in the marketplace, not just the price of the coal (or even an adjusted price of coal). Further, the buyer can use these results linked to a power exchange or database showing the future contract price of electricity in any given market. This additional step truly completes the "decision-loop", in that net revenue accrued to the power producer—the difference between planned production cost and future power sales price—can be compared to the risk of utilizing any one coal.

The preceding table presents an example of the type of results generated from a process model for power production, and as such does not convey a thorough definition of the possible model outputs. For example, the process model will also calculate the production of emissions of species that must be controlled to meet environmental regulations. In fact, this calculation is essential to the process evaluation as the production cost of the entire facility must include the operating cost of environmental control equipment, which of Point F reflects the position in the decision process where the buyer can either accept the range of coals identified by the screening process and evaluated by the model, or return to the marketplace service to consider blends of coals within the marketplace. If results derived from the existing analysis are adequate, then the buyer can schedule an auction, represented by point G. If the selection of coals appear inadequate, the buyer can return to the marketplace to search available coals and construct blends.

Item 3: Search for Blends.

The third marketplace function allows buyers to instruct the software to initiate a search within the marketplace of available coals, to identify coals from which to prepare custom blends or combinations to meet their desired specification. If none of the candidate coals as described by the "seller" in the marketplace can meet the desired specification, or if none of the suppliers can themselves provide such a blend utilizing their own network of contacts, a search tool will examine coals in the marketplace and prepare a recipe to achieve a custom blend. This action is represented by point G1 on the marketplace schematic in FIG. 1.

One interface of the many candidate or possible interfaces that expresses the functionality of the inventive system would resemble the following:

Definition of Desired Coal Blending Instruction

| Purpose Of Blend | Variable 1 Maximized Heating Vale (Btu/lbm) | Variable 2 Maximized Volatile matter | Variable 3 Minimized Potassium content (% of ash) | Variable 4 Minimized Sodium Content (% of ash) | Constrained Variable 1 (specify desired value) Sulfur Content (% of fuel) | Constrained Variable 2 (specify desired value) Acceptable Ash Content (% of ash) |
|---|---|---|---|---|---|---|
| Blend A | 11,654 | 6 | 3 | 3 | 1.5 | 8 |
| Blend B | 10,457 | 8 | 5 | 6 | 1.7 | 10 |
| Blend D | 10,870 | 9 | 2 | 5 | 1.6 | 12 |

-continued

| Purpose Of Blend | Variable 1 Maximized Heating Vale (Btu/lbm) | Variable 2 Maximized Volatile matter | Variable 3 Minimized Potassium content (% of ash) | Variable 4 Minimized Sodium Content (% of ash) | Constrained Variable 1 (specify desired value) Sulfur Content (% of fuel) | Constrained Variable 2 (specify desired value) Acceptable Ash Content (% of ash) |
|---|---|---|---|---|---|---|
| Blend C | | | | | | |
| Blend D | 11,098 | 5 | 4 | 8 | 1.4 | 11 |

The instructions for blending simply allow the user (e.g. the potential "Buyer") to specify the desired values or range of values for the constituents of the coal desired, and allow the special-purpose blending software to create from a combination of coals in the marketplace this desired blend. As shown in the example table, the buyer can request that certain variables can be maximized (such as heating value), while other variables can be minimized (such as sodium, potassium, and other trace elements that induce slagging and fouling in boilers).

The buyer does not need to specify quantitative limits for any of these variables—only that certain variables (variable 1, variable 2, etc¤.) be maximized, and other variables (variable 3, variable 4, etc¤.) to be minimized. Optionally, certain or all variables can be constrained to be within a given range, as desired by the coal buyer. Each blend—specified in the example as Blend A, Blend B, Blend C, and Blend D—will be comprised of a number of constituent fuels. The special blending software will define the specific fractions that each constituent coal comprises in the blend. Further, the aggregate price delivered to the mine—including transportation cost as determined by the transportation model—is calculated, considering the least cost routing given the quantities of coal required for the blend.

As a result, each of the Blends A–B in the example table is characterized by an aggregate composition, and a delivered price to the plant, and thus can be evaluated by the process screening model to estimate the cost of electricity produced by any given unit. As the constructed blends by definition will meet the specifications defined by the Buyer, a preliminary screening is not required. These constructed blends of coals will then be subjected to the process evaluation in step D, and results reported for evaluation by the buyer (Point E). The buyer may elect to continue to search for blends in this manner, until a composition that provides satisfactory results is identified.

Buyers Item 4: Auction Function

The fourth marketplace function allows buyers and sellers to participate in a conventional auction procedure (Point G). The only suppliers that participate in this auction are the shortlist suppliers determined from the process model application to offer the least production cost. For this function, any of the prior art are applicable to the needs of this marketplace. In fact, it is possible that this function of the inventive process could utilize any of several auction or reverse-auction services that are currently offered commercially. An exemplary scenario would be defined by the following events:

1. Coal suppliers whose offered product has been evaluated by the plant process model and have qualified as finalists in the bidding process are notified electronically of their status, and informed of a time and duration of the auction.

2. The auction initiates with a notification to all Suppliers of the status of their bid, in terms of relative ranking in order of lowest evaluated price. Each supplier is aware of the relative ranking of their bid compared to the other suppliers, but may not know either the specific cost or offered price of the presently preferred bidder.

3. Suppliers that are not the least cost (e.g. preferred supplier) have the option to revise their submitted price within a given time period, in order to attain the least cost supplier status.

The auction continues for a predetermined period of time, established at the preference of the buyer, with the least cost supplier the winner (Point H) at closure.

Buyer Item 5. Data Mining and Evaluation for Revised Procurement RFP

Once a specific coal is evaluated and purchased with the inventive system, and delivered to the plant for use, a further refinement is available that utilizes operating experience generated with the subject coal to refine additional, future purchase specifications. Specifically, operators would employ a standard, open systems data management system to store and catalogue operating data that is dependent upon coal composition. This data would be transferred to an advanced data mining program, operated as part of the inventive system and accessible via the internet, to evaluate data with the intent to refine the specification issued by the buyer. For example, the plant operating variables that are affected by coal properties are numerous, and illustrated by the following examples Pulverizer and mill auxiliary power consumption Flue gas temperature, as measured at discrete locations within the boiler or furnace (e.g. furnace gas exit temperature, economizer inlet and outlet temperature, etc.)

Flue gas pressure, as measured at discrete locations throughout the boiler or furnace Induced draft and forced draft power consumption Production of nitrogen oxides emissions at various loads and excess air concentrations The data mining techniques would, for example, identify any relationship between a coal and operating characteristics that may influence the technical "risk" addressed earlier, that is related to coal "quality". For example, excessive temperatures measured in the boiler economizer with a subituminuous coal may suggest that the higher sodium and potassium content of such coals is forming deposits on heat exchanger surfaces, deferring the absorption of heat to the latter section of the boiler (e.g. the economizer). These results would comprise a feedback loop, insuring experience with the purchased coal is reflected in the production of the RFP for future purchases.

By using the inventive method as described herein, coal buyers can select the optimal coal for use in power generation, accounting for factors ranging from power plant performance, transport cost, ability to blend fuels to achieve a desired composition, all within one marketplace concept.

Other Applications

As stated previously, the inventive process applies to the selection and evaluation of any non-commodity item, in which some type of chemical, physical, electrical, or other characteristic or feature distinguishes the item. In this manner, the selection of the source and features of this item does affect the role provided in an chemical, electrical, mechanical, or other process. Accordingly, the selection should consider the performance of the subject process with the candidate items, producing a cost versus performance analysis. This has been illustrated in this disclosure for the selection of coal for power production.

Other applications include, but are not necessarily, limited to, the following: Refinery Operation With Crude Oil. The feedstock of refinery operations is strongly dependent on the characteristics of crude oil to be refined. In fact, refineries, similar to coal-fired power plants, are usually designed for a range of crude feedstock properties to deliver a given product distribution of gasoline, diesel fuel, no . 2 "jet fuel", and heavier fuel oil for transport or power generation. Operators of refineries face the same dilemma as operators of coal-fired power plants, in that the performance of the refinery (or power plant) is dependent on the crude feedstock (or coal) available in the marketplace. Further, the ultimate product varies with selection of feedstock, as does the production cost and revenue stream. Blends of the crude feedstock (similar to blends of coals) can be used to achieve a certain predetermined and desired output. Transportation routing and methods of crude stocks will benefit from a similar integrated analysis as part of complete evaluation. In sum, the inventive system is directly analogous to that described for coal purchases.

Paper Manufacture. The production of paper products can depend on the type and source of feedstock products used. In particular, the composition of the pulp material used in terms of trace content of elements and byproducts of the pulp production can affect paper quality. Blends of pulp material from different sources can be sought to provide a desired composition. Pulp and other feedstock products purchased in the marketplace can similarly benefit from the inventive system.

Numerous other fields of application exist, such in general hydrocarbon processing, industrial chemical production, biochemicals and biochemistry, specialty fuels and solvents, and other industrial materials and items. As integrated circuits become more standard and approach the non-commodity" status of materials in this manner, the design of integrating simple integrated circuits into products can be managed and optimized in this manner.

Integrated Circuits. Certain types of integrated circuits (ICs), the common building blocks of industrial and consumer electronics, can be evaluated and selected from a suppliers database using the inventive method. For example, for the common category of "op-amp" ICs, a limited number of engineering design characteristics define the performance of these devices in commercial products. Examples of these engineering characteristics are the input/output voltage, supply current, and operating bandwidth. Suppliers maintain databases describing the features of candidate ICs in the marketplace, which can provide input to an on-line simulation of the envisioned product. The simulated performance of the commercial product can then be used to judge the applicability in terms of quantitative and semi-quantitative indices, analogous to the production cost and technical risk factors identified for selecting coals. Procurement of the 'optimal' IC follows from this analysis.

What is claimed is:

1. An automated method for conducting buy and sell transactions over a network for a non-commodity material or item that can have differing chemical and physical and/or electrical characteristics, comprising:

a plurality of sellers each providing to the network physical and chemical and/or electrical characteristics via at least one computer of a quantity of the non-commodity available for sale and a cost of the available non-commodity, creating a database of the non-commodity including the different physical and chemical characteristics for each non-commodity available;

a buyer providing to the network a performance simulation model of a chemical, mechanical, or electrical process with equipment currently in operation or intended to be in operation and with a desired amount of the non-commodity for use in the process, the performance simulation model being able to estimate the production cost and operating characteristics of the process based on chemical and physical and/or electrical characteristics of a non-commodity material or item used in the process;

the buyer also providing a desired maximum cost of operating the process, or maximum production cost of material or goods resulting from the process, or desired operating characteristics of the process that are dependent upon the non-commodity material or item; and estimating the cost of operating the process or producing goods from the process for at least some of the different non-commodities from the database of different non-commodities in the performance model to make a comparison of the at least some of the different non-commodities to determine which, if any, of the at least some of the different non-commodities are within the maximum process cost;

providing the buyer with a list of non-commodities that when used as input for the process are within the desired maximum process production or operating cost, or provide certain operating characteristics;

utilizing a database and standard datamining techniques to record performance of the process with a selected non-commodity item, and applying this information in the formulation of a request-for-proposal for future purchases of non-commodity materials or items.

2. The automated method of claim 1 further comprising providing the buyer with a list of non-commodities that provide for the lowest process production or operating cost, or achieving certain operating characteristics.

3. The automated method of claim 1 further comprising determining if blends of different non-commodities from different sellers achieve a lower process production or operating cost than each of the different non-commodities alone, or achieving certain desired operating characteristics, and if so, providing the buyer or at least some of the sellers with a list of which blends of non-commodities that achieve the lower process production or operating cost or provide the desired operating characteristics.

4. The automated method of claim 1 wherein the plurality of sellers provide to the network a current location of each non-commodity and the buyer provides to the network a location of the equipment and wherein the estimation of process production or operating cost utilizing each non-commodity includes an estimated cost of transportation from the current location of each non-commodity to the location of the equipment.

5. The automated method of claim 1 wherein the plurality of sellers also provide to the network a current location of each non-commodity, an available amount of each non-commodity, a period of availability for each non-commodity and a cost of each non-commodity at the current location of each non-commodity.

6. The automated method of claim 1 wherein the network is the Internet.

7. The automated method of claim 1 wherein the non-commodity is selected from the group consisting of: coal for use in steam electric equipment for power generation, crude oil for use in refining of gasoline, electronic components for use in engineering circuitry design and paper pulp for use in paper manufacture.

8. The automated method of claim 1 wherein the buyers also provide the network with a desired source of the non-commodity or provide the network with an indication of no preference as to the source of the non-commodity.

9. An automated method for conducting buy and sell transactions for coal over a computer network, comprising:
a plurality of sellers providing to the computer network physical and chemical characteristics of coals available for sale and a cost of each coal, creating a database of different coals;
a buyer providing to the computer network a performance simulation model of a power production process in power generation equipment currently in operation or intended to be in operation and with a desired amount of coal for use in the power production process, the performance simulation model being able to estimate the performance of the power production process based on chemical and physical characteristics of coals, and project operating characteristics in terms of technical risk or uncertainty associated with using different coals;
the buyer also providing a desired maximum power generation cost, and desired operating characteristics of the power production process due to impacts of coal composition; and
estimating the performance of the power production process for at least some of the different coals from the database of different coals in the performance simulation model to make a comparison of the at least some of the different coals to determine which, if any, of the at least some of the different coals are within the maximum power generation cost and desired range of operating characteristics;
providing the buyer with a list of coals that when utilized in given power production equipment are within the desired maximum power generation cost and operating characteristics due to coal composition impacts.

10. The automated method of claim 9 further comprising providing the buyer with a list of coals that when utilized for power production with a given set of equipment provide for the lowest power generation cost and desired range of operating characteristics.

11. The automated method of claim 9 further comprising determining if blends of different coals from different sellers achieve a lower power generation cost than each of the different coals alone, or provide a certain type of operating characteristic; and if so, providing the buyer or at least some of the sellers with a list of which blends of coals achieve the lower power generation cost or provide a certain type of operating characteristic.

12. The automated method of claim 9 wherein the plurality of sellers provide to the network a current location of each coal and the buyer provides to the network a location of the power generation equipment and wherein the estimation of power generation cost for each coal includes an identification of the least cost transportation method(s), and an estimated cost of transportation from the current location of each coal to the location of the power generation equipment.

13. The automated method of claim 9 wherein the plurality of sellers also provide to the network a current location of each coal, an available amount of each coal, a period of availability for each coal and a cost of each coal at the current location of each coal.

14. The automated method of claim 9 wherein the network is the Internet and wherein the chemical and physical characteristics of the coal comprise: ash content, volatile matter content, fixed carbon content, moisture content, heating value, sulfur content and ash chemistry.

15. The automated method of claim 9 wherein the buyers also provide the network with a desired source of coal or provide the network with an indication of no preference as to the source of the coal.

16. The automated method of claim 9 further comprising utilizing a database describing the operation of the power generation equipment utilizing a coal ultimately selected, and in conjunction with standard datamining techniques defining trends in key operating variables for the coal ultimately selected, and applying an analysis of operating data to refine a request-for-proposal for future purchases of coal.

* * * * *